(12) United States Patent
Xu et al.

(10) Patent No.: US 10,250,832 B1
(45) Date of Patent: Apr. 2, 2019

(54) STACKED ROLLING SHUTTER AND GLOBAL SHUTTER IMAGE SENSOR WITH KNEE SELF POINT CALIBRATION

(71) Applicant: SmartSens Technology (Cayman) Co., Limited., Shanghai (CN)

(72) Inventors: Chen Xu, Shanghai (CN); Yaowu Mo, Shanghai (CN); Zexu Shao, Shanghai (CN); Zhengmin Zhang, Shanghai (CN); Weijian Ma, Shanghai (CN)

(73) Assignee: SMARTSENS TECHNOLOGY (CAYMAN) CO., LTD., Shanghai (CN)

( * ) Notice: Subject to any disclaimer, the term of this patent is extended or adjusted under 35 U.S.C. 154(b) by 0 days.

(21) Appl. No.: 15/968,993

(22) Filed: May 2, 2018

(51) Int. Cl.
*H04N 5/3745* (2011.01)
*H04N 5/372* (2011.01)
*H04N 5/378* (2011.01)
*H04N 5/361* (2011.01)
*H04N 5/363* (2011.01)

(52) U.S. Cl.
CPC ......... *H04N 5/37457* (2013.01); *H04N 5/361* (2013.01); *H04N 5/363* (2013.01); *H04N 5/378* (2013.01); *H04N 5/37213* (2013.01)

(58) Field of Classification Search
None
See application file for complete search history.

(56) References Cited

U.S. PATENT DOCUMENTS

| 6,731,335 B1 | 5/2004 | Kim et al. |
| 7,339,217 B2 * | 3/2008 | Rhodes ............. H01L 27/14609 257/291 |

OTHER PUBLICATIONS

Yannick De Wit, Tomas Geurts; Title: A Low Noise Low Power Global Shutter CMOS Pixel Having Capability and Good Shutter Efficiency; Date: Unknown; pp. 1-4; Pub: Belgium.

* cited by examiner

*Primary Examiner* — Mark T Monk
(74) *Attorney, Agent, or Firm* — Eric Karich; Karich & Associates

(57) ABSTRACT

An image sensor has a stacked pixel arrangement including both rolling and global shutter readout circuits wherein each pixel includes an adjustable transfer transistor gate voltage level for modifying electric charge within a photodiode during exposure depending on incident light intensity. The sensor also has a row decoder circuit providing readout signals to each row of the imaging cells during both a readout interval and during a calibration interval for each row. The row decoder may employ one of several of its features to provide a self-knee point calibration following an image signal readout in order to minimize photo conversion variations that lead to fixed pattern noise and to enhance dynamic range.

11 Claims, 10 Drawing Sheets

STACKED ROLLING SHUTTER AND GLOBAL SHUTTER IMAGE SENSOR WITH KNEE SELF POINT CALIBRATION

BACKGROUND OF THE INVENTION

Field of the Invention

This invention relates generally to image sensors, and more particularly to CMOS image sensors in a stacked chip formation. The bottom chip includes an array of light sensitive regions and structures to capture an image. The top chip includes circuit elements to extract an image from the array. The image sensor may be incorporated within a digital camera.

Description of Related Art

An image capture device includes an image sensor and an imaging lens. The imaging lens focuses light onto the image sensor to form an image, and the image sensor converts the light into electrical signals. The electric signals are output from the image capture device to other components of a host electronic system. The image capture device and the other components of a host electronic system form an imaging system. Image sensors have become ubiquitous and may be found in a variety of electronic systems, for example, a mobile device, a digital camera, a medical device, or a computer.

A typical image sensor comprises a number of light sensitive picture elements ("pixels") arranged in a two-dimensional array. Such an image sensor may be configured to produce a color image by forming a color filter array (CFA) over the pixels. The technology used to manufacture image sensors, and in particular, complementary metal-oxide-semiconductor ("CMOS") image sensors, has continued to advance at great pace. For example, the demands of higher resolution and lower power consumption have encouraged the further miniaturization and integration of these image sensors. However, miniaturization has come with the loss of pixel photosensitivity and dynamic range which require new approaches in order to mitigate these losses.

In addition to an array of pixels, a typical image sensor substrate or chip further includes readout circuitry. Some portion of the readout circuitry may reside within each pixel depending on demands of a particular design. Two of the most common methods for reading off the image signals generated on a sensor chip are the rolling shutter mode and the global shutter mode. The rolling shutter mode involves exposing different lines of the sensor array at different times and reading out those lines in a chosen sequence. The global shutter mode involves exposing all pixels simultaneously and for the same length of time, similar to how a mechanical shutter operates on a legacy "snapshot" camera. Prior art digital imaging systems have utilized either rolling shutter or global shutter readout modes.

Rolling shutter (RS) mode exposes and reads out adjacent rows of the array at different times, that is, each row will start and end its exposure slightly offset in time from its neighbor. The readout of each row follows along each row after the exposure has been completed and transfers the charge from each row into the readout node of the pixel. When all of the rows of the array have been read out a frame of the image has been read and the next frame is begun at the first row of the array. Although each row is subject to the same exposure time, the row at the top will have ended its exposure a certain time prior to the end of the exposure of the bottom row of the sensor array. That time depends on the number of rows and the offset in time between adjacent rows. A potential disadvantage of rolling shutter readout mode is spatial distortion which may result from the above. The distortion becomes more apparent in cases where larger objects are moving at a rate that is faster than the readout rate of the rows and frames. Another disadvantage is that different regions of the exposed image will not be precisely correlated in time and may appear as a distortion in the image. To improve signal to noise in the image signal final readout, specifically to reduce temporal dark noise, a reference readout called correlated double sampling (CDS) is performed prior to the conversion of each pixel charge to an output signal by an in pixel amplifier transistor. The amplifier transistor may typically be a transistor in a source-follower (SF) or common drain configuration wherein the pixel employs a voltage mode readout.

Global shutter (GS) mode exposes all pixels of the array simultaneously. This facilitates the capture of fast moving events, freezing them in time. Before the exposure begins all of the pixels are reset (RST) to the same ostensibly dark level by draining all their charge. At the start of the exposure, each pixel begins simultaneously to collect charge and is allowed to do so for the duration of the exposure time. At the end of the exposure each pixel transfers charge simultaneously to its readout circuit node. Global shutter mode can be configured to operate in a continuous manner whereby an exposure can proceed while the previous exposure is being readout from the readout storage nodes of each pixel. In this mode the sensor has 100% duty cycle which optimizes time resolution and photon collection efficiency. There is no artifact in the image of the period of transient readout that occurs in rolling shutter mode. Global shutter can be regarded as essential when exact time correlation is required between different regions of the sensor area. Global shutter is also very simple to synchronize with reference light sources or other devices.

Global shutter mode demands that a pixel contain at least one more transistor or storage component than a pixel using rolling shutter mode. Those extra components are used to store the image charge for readout during the time period following simultaneous exposure. Again in order to improve signal to noise in the image signal, a reference readout may be required not only to be performed prior to the conversion of each pixel charge to an output signal by an amplifier transistor, but also prior to the transfer of the pixel charge to the extra components of the pixel used to store the image charge during readout.

In summary, rolling shutter can deliver the lowest read noise and is useful for very fast streaming of data without synchronization to light sources or peripheral devices. However it carries risk of spatial distortion especially when imaging relatively large, fast moving objects. There is little risk of spatial distortion when using global shutter and when synchronizing to fast switching peripheral devices. It is relatively simple and can result in faster frame rates. Flexibility to offer both rolling shutter and global shutter can be very advantageous for flexible product design and increased market addressability.

Fixed-pattern noise (FPN) is the term given to a particular noise pattern on digital imaging sensors often noticeable during longer exposure shots where particular pixels are susceptible to giving brighter intensities above the general background noise. FPN is a general term that identifies a temporally constant lateral non-uniformity (forming a constant pattern) in an imaging system with multiple pixels. It is characterized by the same pattern of 'hot' (brighter) and cold (darker) pixels occurring with images taken under the same illumination conditions in an imaging array. This problem arises from small differences in the individual responsivity of the sensor array (including any local post amplification stages) that might be caused by variations in the pixel size, material or interference with the local circuitry. It might be affected by changes in the environment like different temperatures, exposure times, etc.

The term "fixed pattern noise" usually refers to two parameters. One is the DSNU (dark signal non-uniformity), which is the offset from the average across the imaging array at a particular setting (temperature, integration time) but no external illumination and the PRNU (photo response non-uniformity), which describes the gain or ratio between optical power on a pixel versus the electrical signal output. In practice, a long exposure (integration time) emphasizes the inherent differences in pixel response so they may become a visible defect, degrading the image. Although FPN does not change appreciably across a series of captures, it may vary with integration time, imager temperature, imager gain and incident illumination. It is not expressed in a random (uncorrelated or changing) spatial distribution, but rather may occur only at certain, fixed pixel locations.

An opportunity for improvement of fixed pattern noise in image sensors arises when certain components are employed on the sensor chip and also to enhance its ability to adequately image both high lights and dark shadows in a scene. The present invention fulfills these needs and provides further advantages as described in the following summary.

SUMMARY OF THE INVENTION

The present invention teaches certain benefits in construction and use which give rise to the objectives described below.

An image sensor has a plurality of imaging pixel cells. Each pixel cell has one or more photodiodes, one or more transfer transistors paired with each photodiode, a reset transistor, an amplifier transistor in a source follower configuration, a rolling shutter readout circuit and a global shutter image signal storage and readout circuit block. The photodiode(s), the transfer transistor(s), the reset transistor, the source follower transistor, and the rolling shutter readout circuit may comprise a first portion of an array of pixels and may be disposed within a first substrate of a first semiconductor chip for accumulating an image charge in response to light incident upon the photodiode and conveying it to circuits external to the pixel for image processing. The global shutter image signal storage and readout circuit block may comprise a second portion of an array of pixels and may be disposed within a second substrate of a second semiconductor chip for converting the image charge into an image signal and for conveying it to circuits external to the pixel for image processing. The rolling shutter signal output path and the global shutter signal output path may be connected to each other and may be selectable through the use of computer programmable digital register settings. The pixel cell may be supported by additional circuits that are external to the pixel cell but may reside on the same semiconductor substrates. The external circuits may include a row decoder with a mode select feature which may be used to reduce fixed pattern noise and a programmable function logic circuit to provide row decoder circuit timing sequences and signal levels and configurations.

A primary objective of the present invention is to provide an image sensor pixel having advantages not taught by the prior art.

A further objective of the present invention is to provide an apparatus and a method for reducing fixed pattern noise related to variations among image sensor pixels.

A further objective of the present invention is to provide an apparatus and a method for increasing signal dynamic range with reduced fixed pattern noise.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, an image sensor having pixel cells with signal noise reduction components and selectable rolling and global shutter readout modes. Various embodiments of the image sensor are disclosed herein. In the following description, numerous specific details are set forth in order to provide a thorough understanding of the present invention. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

A substrate may have a front side and a back side. Any fabrication process that is performed from the front side may be referred to as a frontside process while any fabrication process that is performed from the back side may be referred to as a backside process. Structures and devices such as photodiodes and associated transistors may be formed in a front surface of a substrate. A dielectric stack that includes alternating layers of metal routing layers and conductive via layers may be formed on the front surface of a substrate.

The terms "connected" and "coupled," which are utilized herein, are defined as follows. The term "connected" is used to describe a direct connection between two circuit elements, for example, by way of a metal line formed in accordance with normal integrated circuit fabrication techniques. In contrast, the term "coupled" is used to describe either a direct connection or an indirect connection between two circuit elements. For example, two coupled elements may be directly coupled by way of a metal line, or indirectly connected by way of an intervening circuit element (e.g., a capacitor, resistor, or by way of the source/drain terminals of a transistor). In the present invention of a stacked chip arrangement the front sides of two chips may be directly connected since the electrical interconnects on each chip will most commonly be formed on the front sides of each chip. However, it is also common practice to utilize through substrate vias to connect a circuit on the frontsides of two stacked substrates wherein the backside of one substrate resides on the frontside of the other. When reference is made to certain circuit elements residing within or formed in a substrate this is generally accepted to mean the circuits reside on the front side of the substrate.

Figure 1:
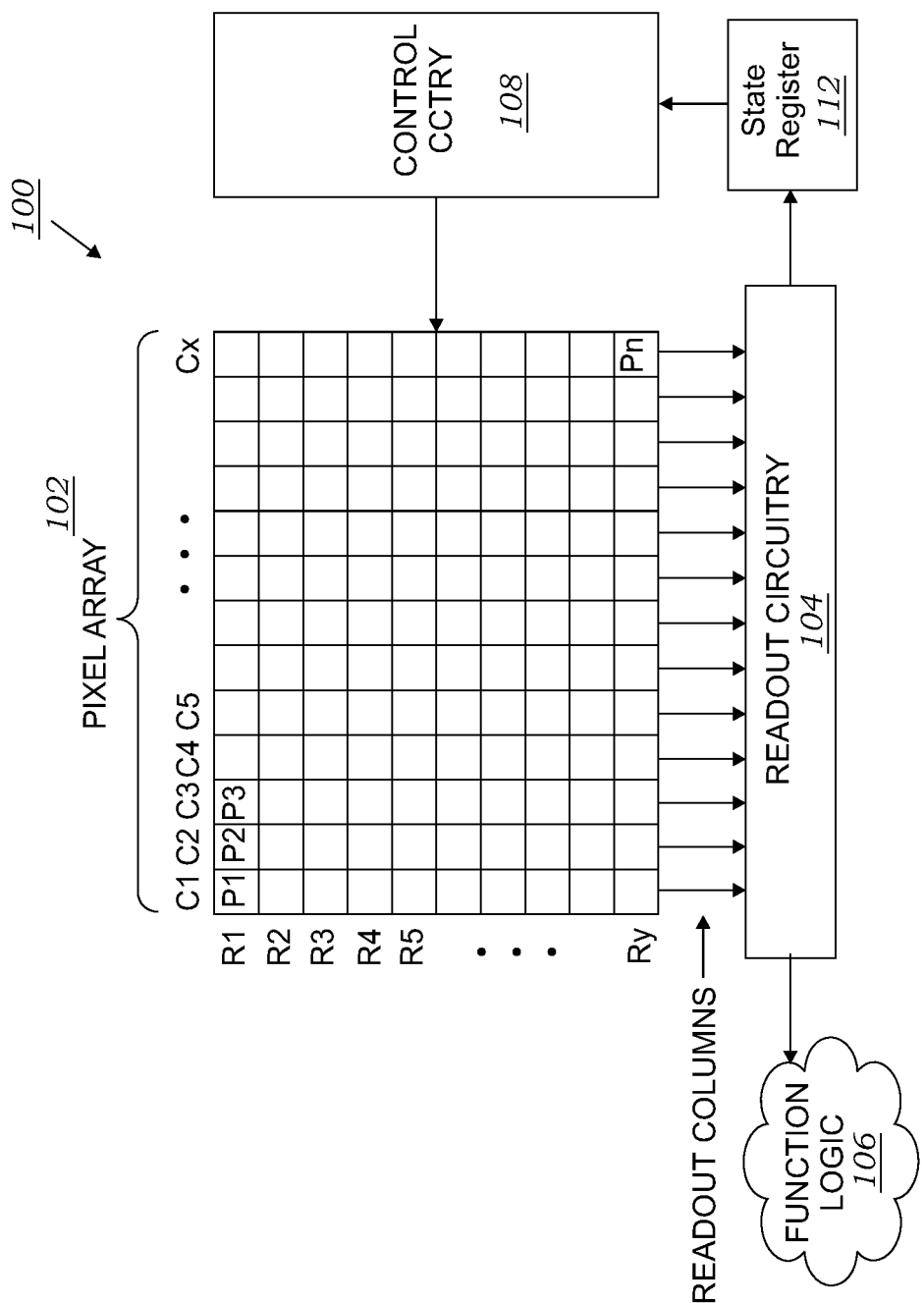
FIG. 1 is a diagram illustrating one example of an imaging system including a pixel array having stacked image sensor pixel cells included in an integrated circuit system according to one embodiment of the present invention.

FIG. 1 is a diagram illustrating a first embodiment of an image sensor system 100 ("imaging system") including a pixel array 102 having a plurality of image sensor pixels included in an example integrated circuit system with features in accordance with the teachings of the present invention. As shown in the depicted example, in the imaging system 100, the pixel array 102 is coupled to control circuitry 108 and readout circuitry 104, which is coupled to function logic 106.

The control circuitry 108 may include a row decoder and a row driver with required timing circuits while readout circuitry 104 may include a column decoder and a column driver with required timing circuits. The control circuitry 108 and the readout circuitry 104 are also coupled to state register 112. In one example, the pixel array 102 is a two-dimensional (2D) array of image sensor pixels (e.g., pixels P1, P2 . . . , Pn). As illustrated, each pixel is arranged into a row (e.g., rows R1 to Ry) and a column (e.g., column C1 to Cx) to acquire image data of a person, place, object, etc., which can then be used to render a 2D image of the person, place, object, etc. Pixels in a given row may share reset lines, so that a whole row is reset at a time. The row select lines of each pixel in a row may be tied together as well. The outputs of each pixel in any given column are tied together. Since only one row is selected at a given time by a decoder, no competition for the output line occurs.

In one example, after each pixel has acquired its image data or image charge, the image data is readout by readout circuitry 104 using a readout mode specified by the state register 112 or function logic 106, and then transferred to the function logic 106. In various examples, readout circuitry 104 may include amplification circuitry, analog-to-digital (ADC) conversion circuitry, or otherwise. The state register 112 may include a digitally programmed selection system, i.e., a configuration, to determine whether readout mode is by rolling shutter or global shutter and what timing and signal levels are employed during each mode. Function logic 106 may simply store the image data or even manipulate the image data by applying post image effects (e.g., crop, rotate, remove red eye, adjust brightness, adjust contrast, or otherwise). In one example, readout circuitry 104 may readout a row of image data at a time along readout column lines (illustrated) or may readout the image data using a variety of other techniques (not illustrated), such as a serial readout or a full parallel readout of all pixels simultaneously. In one example, the control circuitry 108 is coupled to the pixel array 102 to control operational characteristics of the pixel array 102. Some aspects of the operation of the control circuitry 108 may be determined by settings present in the state register 112. For example, the control circuitry 108 may generate a shutter signal for controlling image acquisition. In one example, the shutter signal is a global shutter signal for simultaneously enabling all pixels within the pixel array 102 to simultaneously capture their respective image data during a single acquisition window. In another example, the shutter signal is a rolling shutter signal such that each row, column, or group of pixels is sequentially enabled during consecutive acquisition windows.

Figure 2:
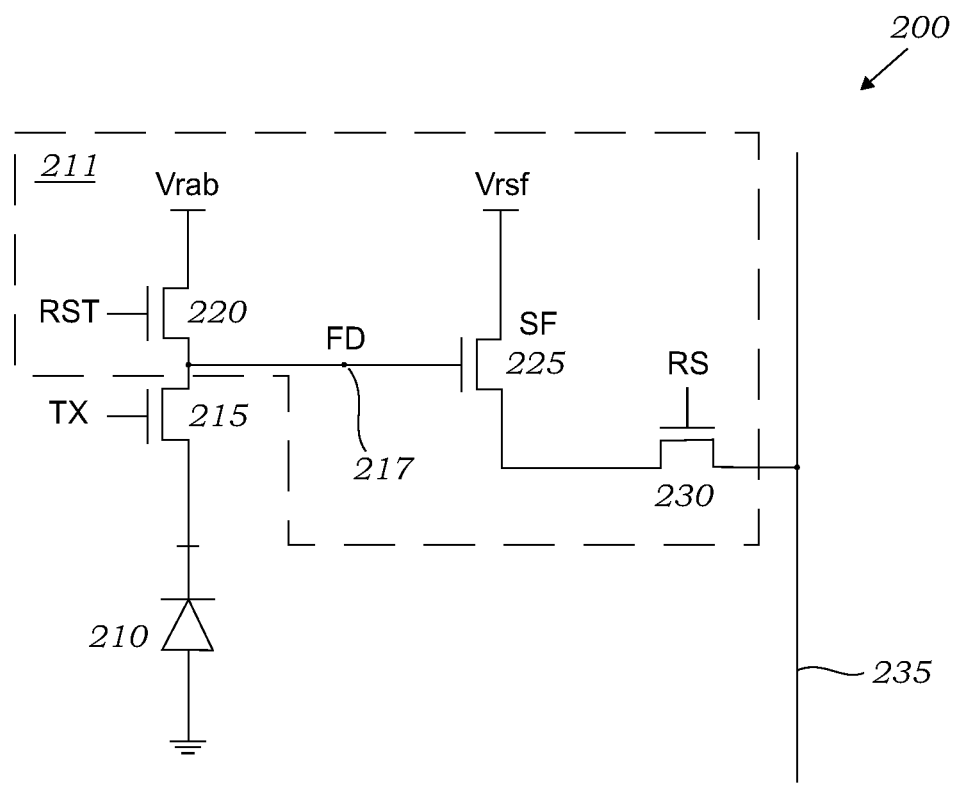
FIG. 2 is an electrical schematic of a prior art stacked image sensor pixel cell with rolling shutter readout.

FIG. 2 is an electrical schematic that illustrates an image sensor pixel cell with rolling shutter readout found in the prior art. This figure and example pixel are provided to simplify explanation of pixel operation in anticipation of a description of an example of the present invention. Each sensor pixel 200 includes a photodiode 210 (e.g., photosensitive element) and an associated transfer transistor 215 and pixel support circuitry 211 as shown. The photodiode 210 may be a "pinned" photodiode as is commonly present in CMOS image sensors. In one example, pixel support circuitry 211 includes a reset transistor 220, source follower (SF) amplifier transistor 225, and row select transistor 230. Pixel circuitry 211 is coupled to transfer transistor 215 and photodiode 210 through a floating drain FD (i.e., floating diffusion node 217). During operation, photosensitive element 210 photo-generates charge in response to incident light during an exposure period. The transfer transistor 215 is coupled to receive a transfer signal TX, which causes transfer transistor 215 to transfer the charge accumulated in photodiode 210 to the floating diffusion node 217. Floating diffusion node 217 is in effect the drain of transfer transistor 215 while the photodiode 210 is the source of transfer transistor 215. In one embodiment transfer transistor 215 is a metal-oxide semiconductor field-effect transistor (MOSFET). Reset transistor 220 is coupled between power a supply Vrab and floating diffusion node 217 to reset sensor pixel 200 (e.g., discharge or charge floating diffusion node 217 and photodiode 210 to a preset voltage) in response to a reset signal RST. Floating diffusion node 217 is coupled to control the gate terminal of source-follower amplifier transistor 225. Source-follower amplifier transistor 225 is coupled between power rail Vrsf and row select transistor 230 to amplify a signal responsive to the charge on the floating diffusion FD node 217. Row select transistor 230 couples the output of pixel circuitry from the source-follower amplifier transistor 225 to the readout column, or bit line 235, in response to a row select signal RS. Photodiode 210 and floating diffusion node 217 are reset by temporarily asserting both reset signal RST and transfer signal TX. The accumulating time interval (e.g., exposure period) begins when the transfer signal TX is de-asserted, which permits incident light to photo-generate charge in photodiode 210. As photo-generated electrons accumulate in photodiode 210 its voltage decreases (electrons are negative charge carriers). The voltage or charge on photodiode 210 is representative of the intensity of the light incident on photodiode 210 during the exposure period. Also, the higher the intensity of the incident light the more rapidly will the voltage or charge change on photodiode 210. At the end of the exposure period, the reset signal RST is de-asserted, which turns off reset transistor 220 and isolates floating diffusion node 217 from Vrab. The transfer signal TX is then asserted to couple photodiode 210 to floating diffusion node 217. The photo-generated charge is transferred from photodiode 210 to floating diffusion node 217 through transfer transistor 215, which in turn causes the voltage of floating diffusion node 217 to drop by an amount proportional to photo-generated electrons accumulated on photodiode 210 during the exposure period.

Conventionally, CMOS image sensors have several limitations, for example, limited dynamic range and blooming. CMOS imagers generally are characterized by a linear voltage-to-light response, that is, the imager output voltage is approximately linearly proportional to the integrated intensity of the light incident on the imager. The imager output voltage can be characterized by a dynamic range, given as the ratio of the maximum detectable illumination intensity of the imager to the minimum detectable illumination intensity of the imager. It is well understood that the dynamic range of the output voltage sets the overall dynamic range of the imager. The illumination intensity that causes the photodiode capacitance charge to be completely dissipated prior to the end of the exposure period, thereby saturating the pixel, sets the upper end of the pixel dynamic range, while thermally generated photodiode charge and other noise factors set the lower end of the pixel dynamic range. If the dynamic range of a scene to be imaged exceeds the dynamic range of an imager, portions of the scene will saturate the imager and appear either completely black or completely white. This can be problematic for imaging large dynamic range scenes, such as outdoor scenes. Efforts to reduce the impact of reset sampling noise on dynamic range have relied on correlated double sampling (CDS). CDS is a technique of taking two samples of a signal out of the pixel and subtracting the first from the second to remove reset sampling noise. Generally, the sampling is performed once immediately following reset of the photodiode and floating diffusion and once after the photodiode has been allowed to accumulate charge and transfer it to the floating diffusion. The subtraction is typically performed in peripheral circuitry outside of the pixel and may increase conventional image sensor area although it may not increase pixel area. An image sensor utilizing a rolling shutter readout mode may incorporate CDS with only added peripheral circuit elements and no additional circuit elements in the pixel. An image sensor utilizing global shutter however may require multiple capacitors and transistors inside the pixel which may decrease the fill factor. It is advantageous to maintain reduced fill factor by partitioning the additional components required for CDS on to a circuit chip separate from and stacked on top of a sensor chip.

Figures 3A, 3B:
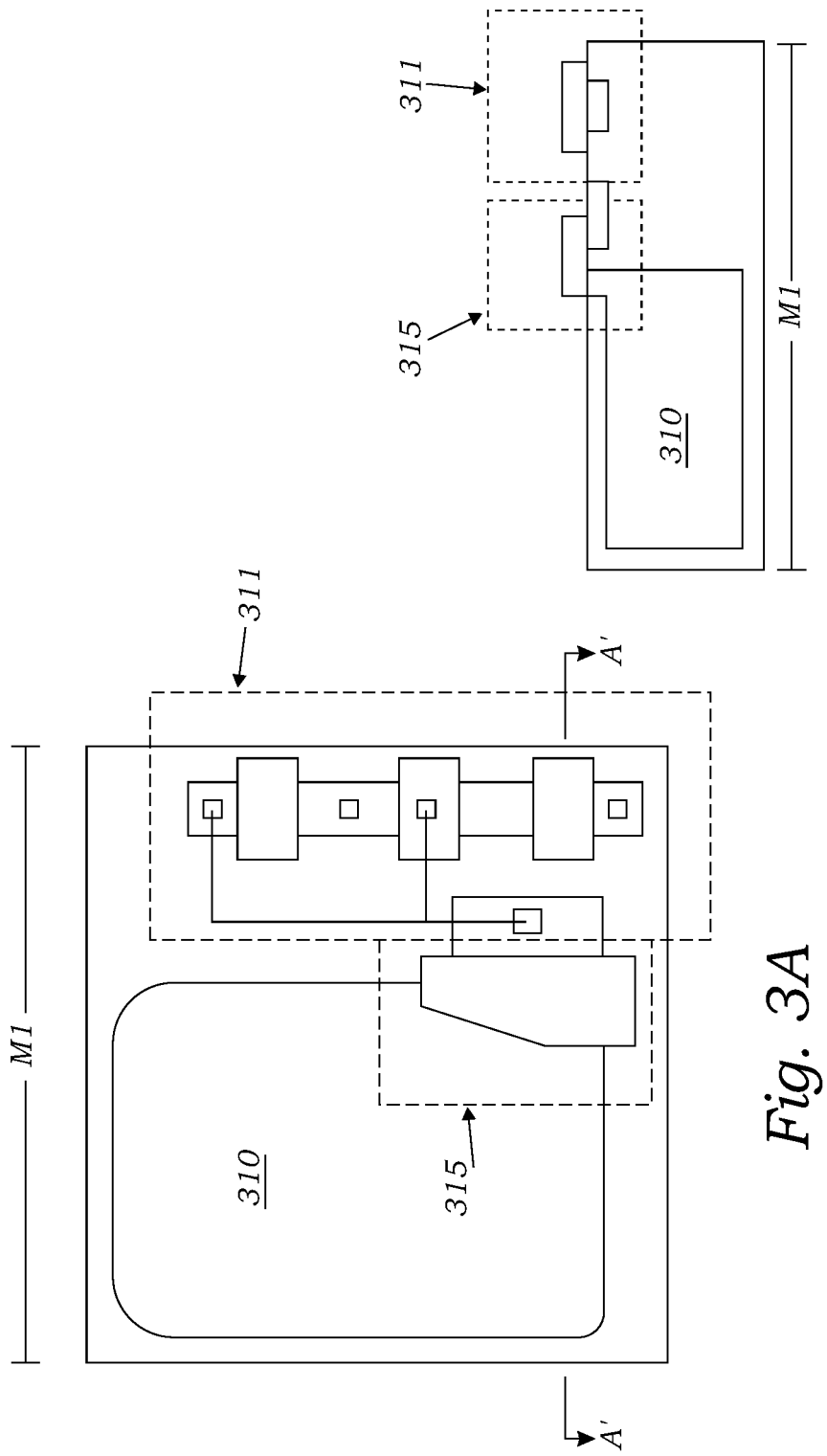
FIG. 3A is a diagram of a prior art pixel cell layout wherein photodiode, transfer transistor, and amplifier transistor occupy the same semiconductor wafer or chip.
FIG. 3B is a cross section diagram of the prior art pixel cell shown in FIG. 3A.

FIG. 3A is a diagram illustrating a common pixel cell layout in the prior art wherein photodiode 310, transfer transistor 315, and pixel circuitry 311 occupy the same semiconductor wafer or chip. FIG. 3B is a cross section diagram of the pixel cell shown in FIG. 3A along its cross section line A'A'. Photodiode 310 and pixel circuitry 311 correspond in kind to the photodiode and pixel circuitry denoted as photodiode 210 and pixel circuitry 211 in FIG. 2 except that they occupy the same semiconductor substrate wafer or chip. Transfer transistor 315 occupies the same location electrically as does transfer transistor 215 in FIG. 2 except that transfer transistor 315 is a commonly understood planar complementary metal-oxide semiconductor field-effect transistor (CMOSFET) wherein its source, channel, and drain components are located within the semiconductor substrate and parallel to the surface of the semiconductor substrate. It is advantageous for die dimension M1, as illustrated in FIGS. 3A and 3B to be as small as possible in order to reduce pixel array size and manufacturing cost. However die dimension M1 is limited by required minimum design rules of a manufacturing technology generation which set the closest approach of for example pixel circuitry 311 to transfer transistor 315. This situation is among the factors that drove the separation of pixel cells into two stacked chips where the pixel circuitry can be stacked over the photodiode and transfer transistor to result in a reduction of die dimension M1.

Figures 4A, 4B:
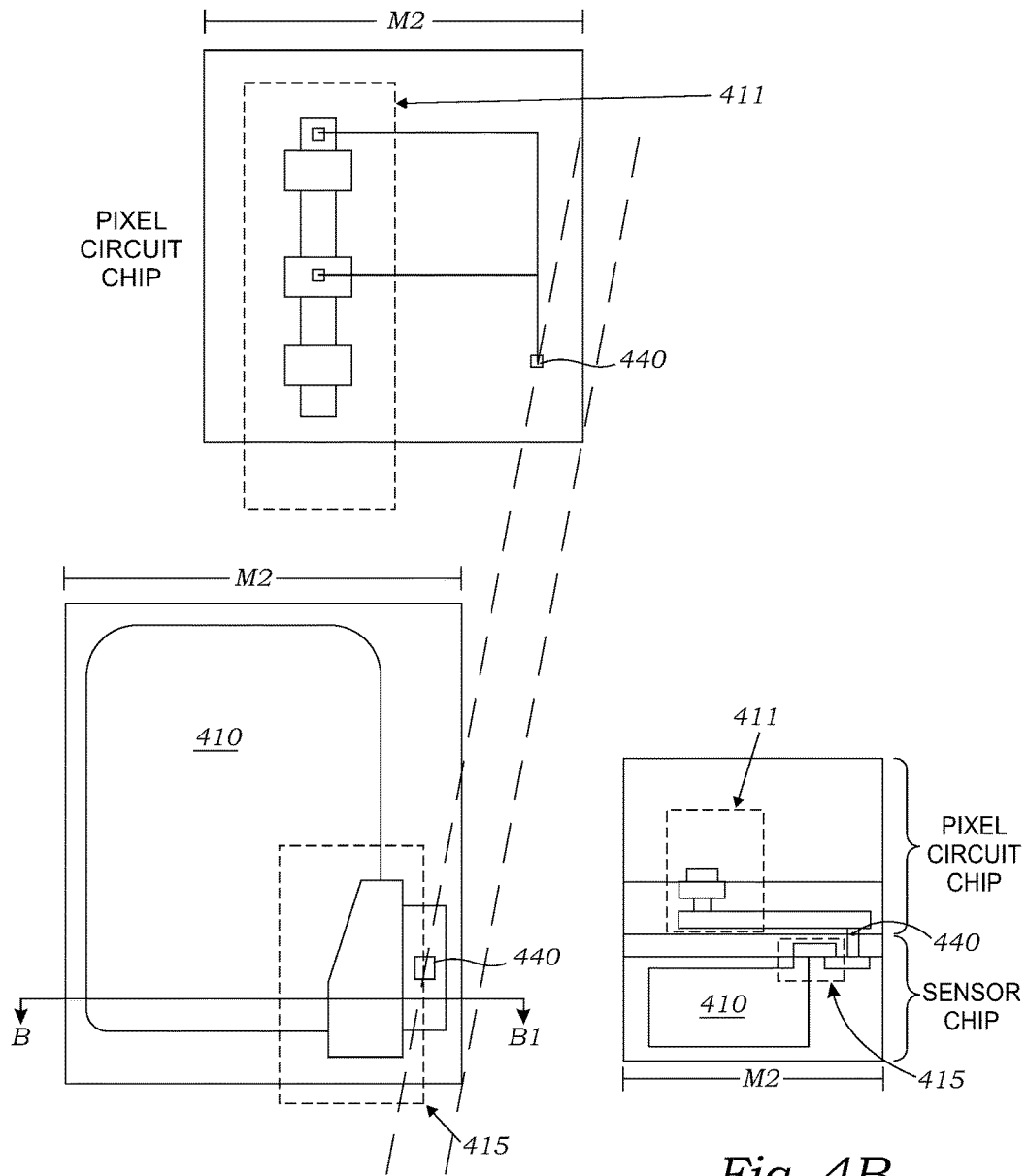
FIG. 4A is an exploded view diagram of a prior art pixel cell layout.
FIG. 4B is a cross section diagram of the prior art pixel cell shown in FIG. 4A.

FIG. 4A is an exploded view diagram illustrating a common pixel cell layout in the prior art wherein photodiode 410 and planar CMOSFET transfer transistor 415 are located on the semiconductor substrate of a sensor wafer of chip and pixel circuitry 411 is located on a separate substrate of a circuit semiconductor wafer or chip. FIG. 4A shows an exploded view of a sensor chip and its components positioned on its upper surface aligned, to a circuit chip with its components positioned on its underside, at inter-chip interconnect 440. In the case of FIG. 4B the underside of the circuit chip is actually the frontside of its substrate as frontside has been previously herein defined. FIG. 4B is a cross section diagram of the pixel cell shown in FIG. 4A along its cross section line BB1 including the overlying portion of the circuit chip. FIG. 4B illustrates the two stacked semiconductor chips are electrically coupled by inter-chip interconnect 440. Comparing FIG. 3A and FIG. 4A one skilled in the art will appreciate that, assuming photodiodes 310 and 410 have the same dimensions, die dimension M2 is smaller than dimension M1 thus providing an opportunity for manufacturing cost reduction.

In the stacked assembly illustrated in FIG. 4A and FIG. 4B the limiting die dimension is determined by the sensor chip. Assuming it is desired to retain the dimensions of the photodiode, one opportunity for further reduction to die dimension is to reduce the transfer transistor size or relocate it within the footprint of the photodiode.

Another problem from which conventional CMOS image sensors suffer is a phenomenon called blooming. Image sensor devices that integrate charge created by incident photons have dynamic range limited by the amount of charge that can be collected and held in a given photodiode. For example, the maximum amount of charge that can be collected and detected in a photodiode is proportional to the photodiode area. A reverse biased photodiode creates a potential well between the two doped regions of the photodiode which roughly defines the sensing area. During the optical integration period, electrons are created in or near the photodiode well at a rate proportional to the light intensity reaching the sensing area. As the electrons are collected in the photodetector, it begins to fill. If the photodetector charge well becomes full of charge, it becomes saturated and blooming may occur. Blooming is a phenomenon in which excess charge from a pixel spills over into adjacent pixels, causing blurring and related image artifacts. Blooming may cause the neighboring pixels to look brighter than an accurate representation of the light absorbed by the photodiode in that pixel.

One solution for blooming is shunting off the excess current caused by the incoming light once the pixel becomes full. A mechanism for doing this uses an anti-blooming (AB) transistor, which is ordinarily used to remove all electrons from global shutter pixel well before beginning an exposure. During exposure, the anti-blooming transistor can be biased slightly to operate in the sub-threshold region, allowing excess charge to flow to the anti-blooming transistor drain. The use of an anti-blooming transistor to prevent blooming is very sensitive to the voltage applied to the AB transistor gate. If the gate voltage is too low, no electrons (or an insufficient number of electrons) will be shunted out of the pixel well and blooming may occur. If the gate voltage is too high, blooming will be prevented, but at the cost of limiting the dynamic range of the pixel, because electrons will be shunted out of the pixel well before the well is full, limiting the maximum charge that can be collected. The optimum voltage is the voltage needed to slightly turn "on" the pixel AB transistor slightly, just enough to shunt excess charge to a voltage source and prevent it from bleeding into nearby pixels when it is exposed to light.

Another mechanism for preventing blooming without the incorporation of an anti-blooming transistor is to operate the transfer transistor in a manner similar to that described earlier with respect to an anti-blooming transistor. That is, during exposure the transfer transistor gate electrode can be biased slightly to operate in its sub-threshold region, allowing any excess charge to flow to the transfer transistor drain. This partially on transfer transistor mechanism may also change the rate at which the photodiode well responds to the intensity of the incident light depending on when during the exposure period the bias is applied. However, the actual voltage reaching the transfer transistor gate electrode depends on a variety of factors, including manufacturing process parameters and the temperature of the imager array. For example, the transfer transistor gate electrode threshold voltage may vary due to manufacturing process non-uniformities. Since the transfer transistor may be biased in its sub-threshold region the actual bias voltage may vary from imager array to imager array and from pixel to pixel within an array.

Prior approaches to managing this impact of the mismatch in the transfer transistors failed to account for these variations, and suffered from blooming or reduced dynamic range and a relatively high level of an artifact known as fixed pattern noise (FPN). The result is a noise pattern evident in captured images that is constant and reproducible from one image to another. Fixed pattern noise (FPN) is easily apparent to a human observer of an image due to the observer's inherent sensitivity to edges in the image. Manufacturers have compensated for the repeating fixed pattern noise errors in a number of manners. One solution used by manufacturers has been to provide a fixed pattern noise error register for each column (or row) in an array whereby the register associated with the specific column would have a stored error correction value to correct the noise associated with that column. It should be noted that typically the noise associated with the column (or row) would be applied to each storage element in the entire column (or row). While effective, the design costs of implementing a storage location for each column (or row) in a photosensitive array is large, thereby resulting in increased design cost. Consequently, any system which reduces the FPN in an image presented to an observer would be advantageous.

One refinement of pixels incorporating a partially on transfer transistor is the pixel design in which the transfer transistor gate electrode control signal, TX', is stepped down (or up) in voltage monotonically from a starting point to a low (or high) end point during the photodiode integration period when a high light intensity is determined to be incident on the photodiode. Signal TX' is generally kept in the subthreshold region of the transfer transistor (transistor 215 in FIG. 2, for example). As described earlier, under high light intensity conditions a transfer transistor may be set at a gate electrode bias level suitable to drain from the photodiode any charge above a designed level to prevent saturation of the photodiode and overflow of charge to nearby photodiodes. In this way the pixel full well charge is modified dynamically in response to the incident image intensity. Typically the drain of the transfer transistor is set at a positive high level, for example, by coupling it through a reset transistor to a reset supply voltage Vrab. The reset supply may be a voltage near the high positive power supply allowed for the technology generation in which the image sensor is fabricated. The previously described refinement of pixels which incorporates a mode in which the transfer transistor gate electrode is stepped down (or up) steadily during the integration period accomplishes a more gradual draining of charges from the photodiode during a portion of the integration (or exposure) period. The result is a type of enhanced dynamic range in which the photodiode transfer curve is transformed from a single rising line to one with two or more sections and slopes as illustrated in FIGS. 5A and 5B.

Figure 5A:
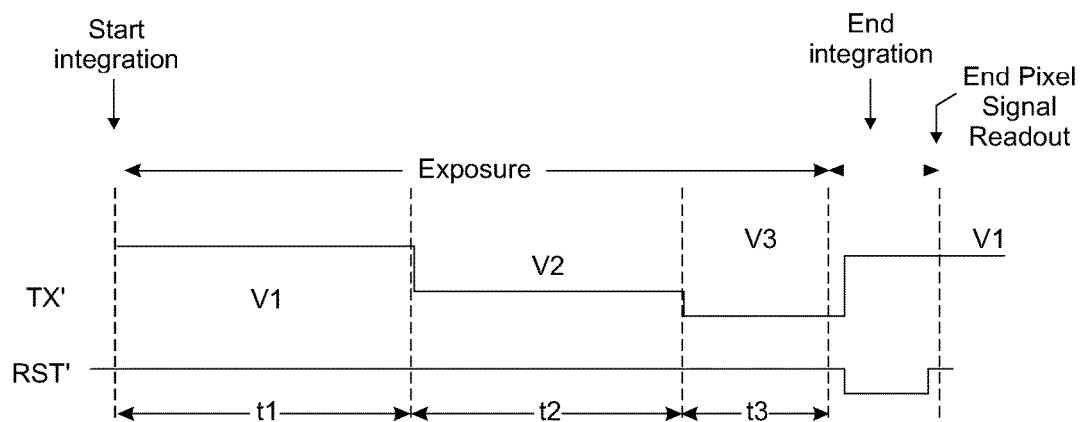
FIG. 5A is a timing diagram illustrating voltage levels applied to the transfer transistor of a pixel according the invention in a manner to achieve an improved dynamic range in accordance with a first embodiment of the invention.

FIG. 5A illustrates two signals, TX' and RST', applied to transistors 215 and 220 respectively of the rolling shutter pixel illustrated in FIG. 2 in a manner to achieve an improved dynamic range. FIG. 5A shows signal levels for signals TX' and RST' during a time interval starting at the beginning of an integration or exposure period and ending after the pixel charge has been converted to a pixel signal voltage and read out. Signal RST' is at a high level during an exposure time portion of the integration period and then goes low. With signal RST' high, reset transistor 220 is maintaining charge storage node FD near a voltage Vrab and then when RST' is low, reset transistor 220 is turned off to facilitate transferring an image charge from photodiode 210 to node FD and through amplifier transistor SF1 before reset transistor 220 is set high again for the next integration and exposure periods. Signal TX' is shown to progress through at least three successively lower levels, V1, V2, and V3 during three respective intervals t1, t2, and t3 of the exposure period with each level draining successively less charge from photodiode PD to prevent it from saturating. As an example, V1 may be a level that places transfer transistor 215 in its linear operating region and during its operating period t1 transfer transistor 215 may be on and causing photodiode 210 to become reset to the reference voltage Vrab. During period t2 TX' switches to level V2 which may be a level in the sub-threshold operating region of transistor 215 allowing a small amount of charge to be drained through transistor 215. During period t3 TX' switches to V3 which may be a value well below sub-threshold and may even be negative to ensure transistor 215 is cut off. Following period t3 reset transistor 220 is turned off by setting RST' low followed by setting TX' high to V1 again to drain and readout the signal charge from photodiode 210 on to floating drain FD and out through amplifier transistor 225 as an image signal. The TX' level V2 is principally responsible for the dual slope of the pixel transfer curve and its knee point as illustrated in FIG. 5.

Figure 5B:
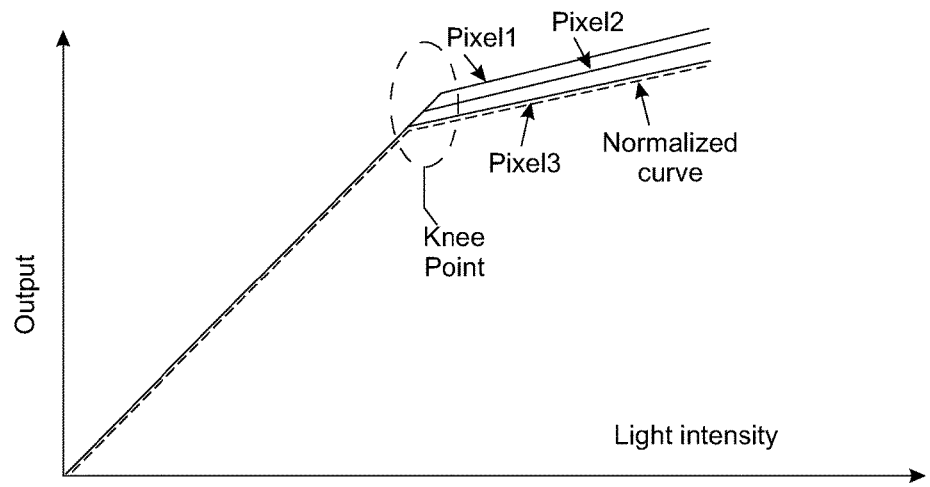
FIG. 5B illustrates the rise in accumulated pixel photodiode charge as a function of light intensity during an exposure period for three different pixels.

FIG. 5B illustrates, for a fixed exposure time, the pixel transfer curve, or its image signal output versus light intensity function, for three representative pixels, Pixel1, Pixel2, and Pixel3. The graph illustrated shows a two segment piecewise linear curve formed by two joined line segments with different slopes, the upper line segment having a lower slope. The break point or knee point is the point where the signal on the transfer transistor begins to remove charge from the photodiode and the slope of the upper segment is determined by the amount of light generated charge that is drained off the photodiode through TX. FIG. 5B shows the upper line segments for the three pixels to be displaced from one another. This displacement is thought to be due to the variation in the respective transfer transistor gate electrode threshold voltages for the three pixels illustrated. This variation is due to manufacturing variation and may result in unwanted fixed pattern noise FPN. It is the principal objective of the invention described herein to minimize the FPN artifacts related to the transfer transistor gate electrode threshold voltage variation. The invention as described in the following employs a self-calibration apparatus and method to minimize the knee point variation related to the transfer transistor gate electrode variation.

Figure 6:
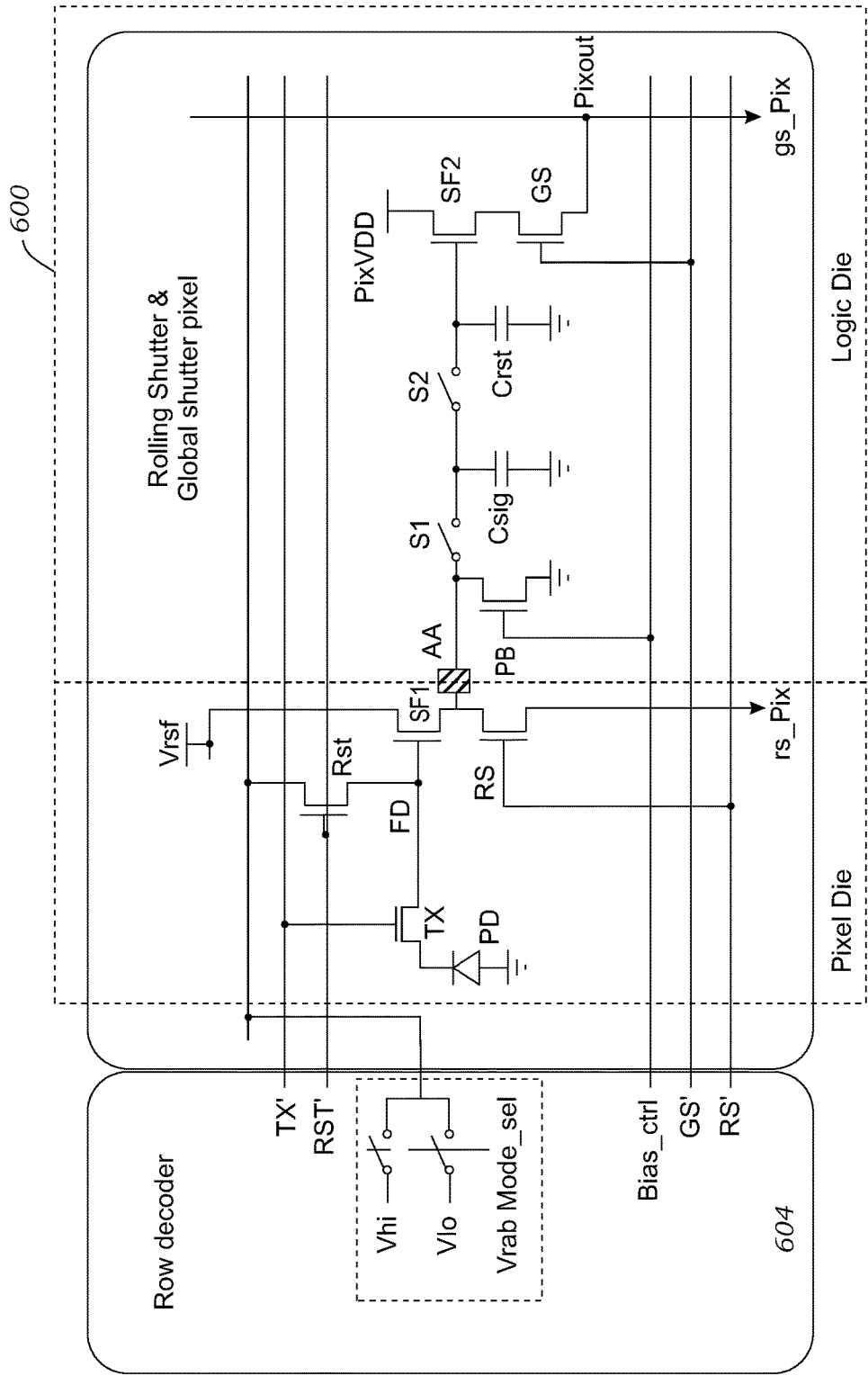
FIG. 6 is an electrical schematic diagram of a representative pixel portion of an image sensor array and an associated row decoder circuit portion of the image sensor in accordance with an embodiment of the invention.

FIG. 6 is a schematic diagram illustrating one embodiment of invented stacked pixel 600 with selectable rolling shutter and global shutter readouts and dynamic range enhancement through self-calibrating knee point. FIG. 6 illustrates a pixel die stacked on a logic die. The pixel die portion of the stacked pixel comprises one or more photodiodes PD and associated transfer transistors TX, a reset transistor Rst, a first source follower amplifier transistor SF1 and a rolling shutter select transistor RS. The logic die portion of the stacked pixel comprises global shutter storage elements Csig and Crst with switches S1 and S2, a bias transistor PB, a second source follower amplifier transistor SF2 and a global shutter select transistor GS. The pixel die portion and the logic die portion are electrically connected by at least one inter-chip interconnect AA. Under control of a row decoder 604, stacked pixel 600 may readout an imaging signal in a rolling shutter mode as rs_pix or in a global shutter mode as gs_pix. To economize interconnections output leads for rs_pix and gs_pix may also be connected together into a single output connection.

One key inventive apparatus element of the present invention which provides an advantage over the prior art is the portion of the invented row decoder circuit 604 as illustrated in FIG. 6 denoted by Vrab Mode_sel. Row decoder circuit 604 provides to each row of pixels the control signals TX', RST', RS' and GS' which are applied to transistors TX, Rst, RS and GS respectively during the course of image capture, storage and readout for each row of the imaging pixel array. Bias_ctrl provides a DC bias through transistor PB to transistor SF1. Vrab Mode_sel provides a bimodal selection of either bias Vhi or Vlo to the drain of reset transistor Rst. The inventive element involves Vrab Mode_sel providing either Vhi or Vlo in coordination with providing certain voltage levels TX' on transfer transistor TX which result in a reduction of the impact of any transfer transistor threshold voltage variation on resulting imaging array fixed pattern noise (FPN). The voltage level Vlo may be an intermediate level from zero to Vhi. One inventive method incorporating the Vrab Mode_sel shown in the schematic of the apparatus illustrated in FIG. 6 for reducing FPN in an image sensor utilizing multiple transfer transistor gate electrode voltage levels to enhance pixel dynamic range is illustrated in FIG. 7.

Figure 7:
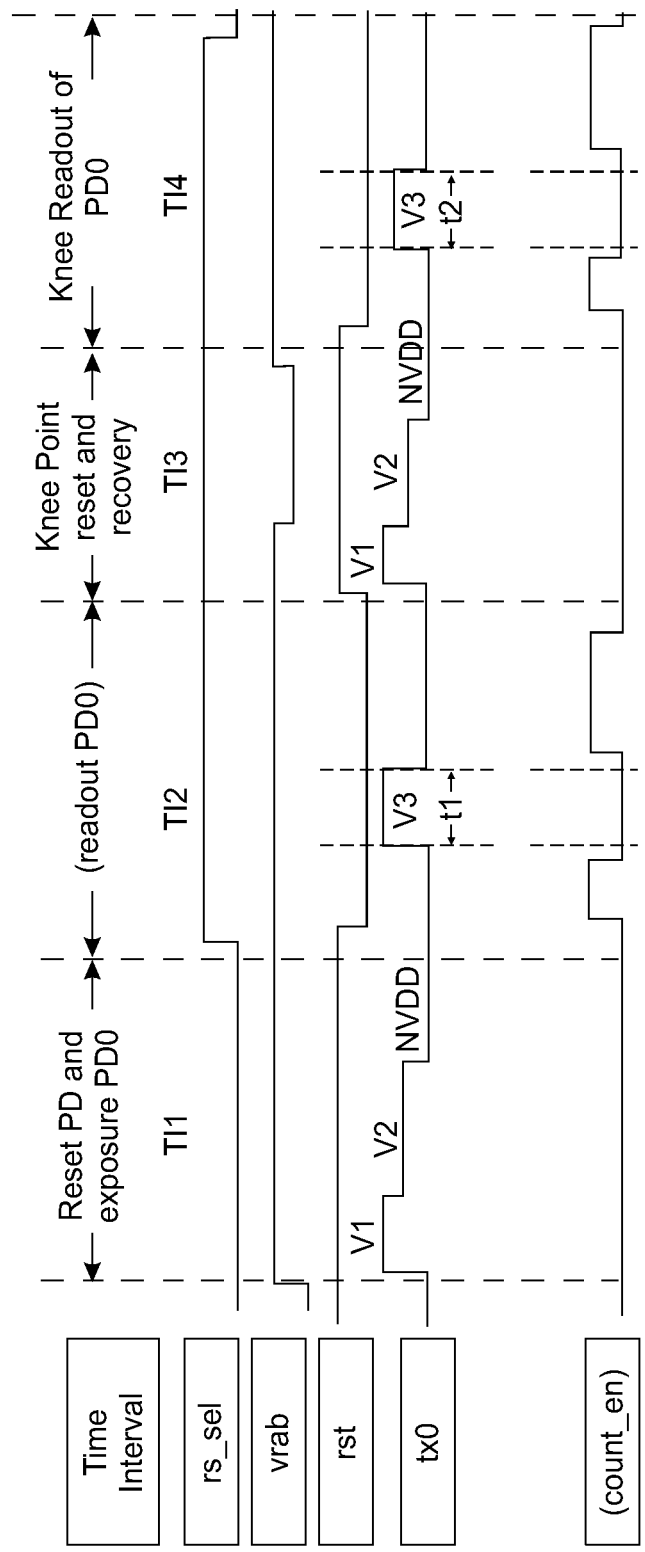
FIG. 7 is a timing diagram that illustrates a method for self knee point calibration in accordance with an embodiment of the invention.

FIG. 7 is a timing diagram that illustrates the invented method of operation of the invented apparatus for self knee point calibration. Illustrated are control signal timings and levels for image sensor control circuitry and readout circuitry as they function in sequences defined according to a programmable function logic circuit, for example like function logic 106 as illustrated in FIG. 1, to collect and readout in a rolling shutter mode an image signal for a single row. FIG. 7 illustrates four time intervals required to obtain an image signal from the zeroth row of pixels including self knee point calibration and application. The four intervals comprise a photodiode reset and expose interval, a photodiode image signal readout interval, a knee point reset and recovery interval, and a knee point readout interval. The first two intervals accomplish the acquisition and readout of an image signal including knee point HDR enhancement and the second two intervals accomplish a self-knee point calibration to reduce FPN and further enhance HDR. The sequence begins with a global exposure step in which all rows of an image array are exposed to incident light forming an image on the array. In FIG. 7 signals and control voltages rs_sel, rst, tx0 and vrab correspond functionally to signals and control voltages RS', RST', TX' and Vrab (Vhi or Vlo) respectively illustrated in FIG. 6. Also illustrated in FIG. 7 is the timing trace for a counter enable (count_en) signal which, when high, denotes an analog to digital conversion taking place on the signals during their readouts.

During the first time interval (TI1) illustrated in FIG. 7 photodiode PD0 is reset and exposed, i.e. allowed to integrate image charge. During this interval rs_sel is low, rst is high, vrab is at level Vhi. Also during this first internal tx0 is first set at a high level V1 which resets the photodiode to near Vhi and clears photo generated charges followed by tx0 being set to a level V2 which is in the sub-threshold region of the transfer transistor and defines the knee point of the pixel transfer curve. If the incident light has high intensity then the level V2 is set at a value that will bleed excess photo generated charge from the photodiode and prevent blooming and in effect increase dynamic range. Finally tx0 is set to a cutoff voltage level NVDD which prevents charge from leaving the photodiode. Next, during the second time interval (TI2) illustrated in FIG. 7, rs_sel is set high to cause the subsequently transferred image signal to be sent out through the source follower amplifier and on to a column line. Then also during the second interval rst goes low to allow a reference signal value to be read out followed by tx0 being set at a high level V3 for a time period t1 during which the signal charge being held on the photodiode is transferred to the source follower amplifier and on to the column line as the image signal representative of the illumination that was incident upon the photodiode during the exposure period.

During the third time interval (TI3) illustrated in FIG. 7 a key element of the invention is enabled when conditions are created to determine and calibrate the knee point level V2 first used during the first interval and to be reapplied with modifications, if needed, during a subsequent row exposure to reduce FPN over the resultant image read out from the array. Specifically, during the third interval rst goes high followed by tx0 being initially set high to V1 to reset the photodiode. Then at the same time tx0 is set to V2, vrab is set to Vlo followed by tx0 being set to cut off at NVDD which is followed by vrab being returned to Vhi. It is at this point at the end of the third interval that a signal has been captured on the photodiode that is reflective of the knee point value previously applied to the transfer transistor but with a different voltage applied to its drain, i.e., Vlo instead of Vhi. Upon readout of this knee point calibration signal during the fourth time interval (TI4) this knee point calibration signal may be combined with the earlier image signal to determine the knee point calibration signal which is used to reset the knee point value applied to tx0 at the next opportunity, i.e., during the next frame. So during the fourth interval illustrated in FIG. 7 rs_sel remains high, vrab goes back to Vhi, rst is taken low while tx0 is cut off in order to provide a reference signal to be read on to the column line. Next the value of tx0 is taken to high level V3 for a time t2 to read out the image signal combined with the knee point related signal after which rs_sel is set low to prevent signals from going on to the column lines.

In summary to enhance the dynamic range of a stacked pixel during a rolling shutter readout the key inventive elements involve providing a bimodal selectable reset power supply vrab and capturing and reading out two consecutive imaging signals including with a knee point level applied to the transfer transistor wherein the first imaging signal is captured with vrab at Vhi and the second imaging signal is captured with vrab at Vlo and then determining a new knee point level, i.e., a self-knee point calibration, to be applied in subsequent imaging to reduce fixed pattern noise related to the natural variation of threshold voltages on the transfer transistors.

Figure 8:
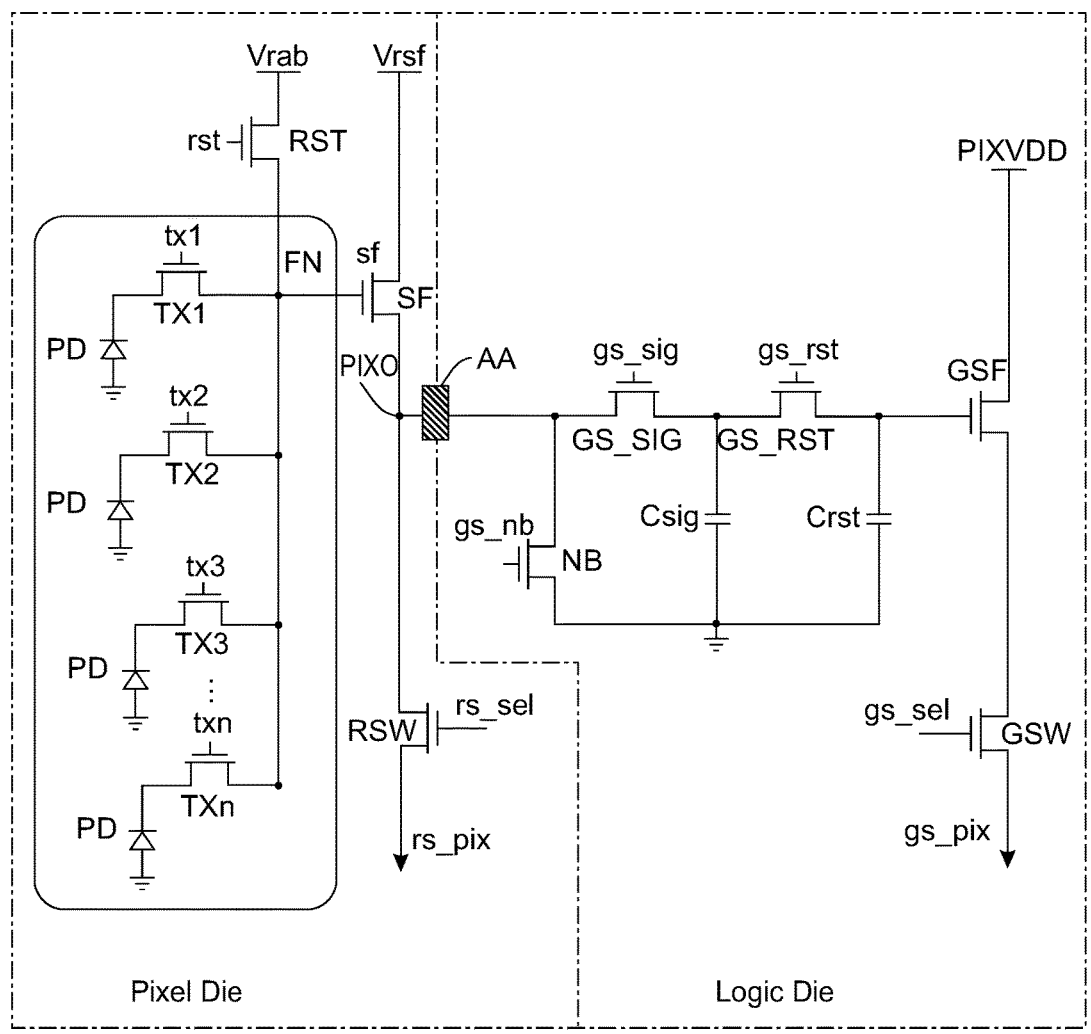
FIG. 8 is an electrical schematic diagram of a representative pixel portion of an image sensor array and an associated row decoder circuit portion of the image sensor in accordance with another embodiment of the invention.

In order to enhance the dynamic range of a stacked pixel comprising both rolling shutter and global shutter readout circuitry during a global shutter readout by using self knee point calibration, the key inventive elements involve an image signal readout through the global shutter readout circuitry followed by a calibration image signal readout through the rolling shutter circuitry. The two signals derived through different electronic paths is used to determine the knee point voltage level and to provide an updated level value if needed to reduce fixed pattern noise related to the natural variation of the threshold voltages of the transfer transistors. FIG. 8 illustrates a circuit schematic diagram of a stacked pixel comprising both rolling shutter and global shutter readouts. It is similar to that shown in FIG. 6 but with no row decoder included and the addition of three more photodiode and transfer transistor pairs which share the same floating node FN. The circuit elements and signal names and power supply identifiers are substantially the same and a description is not required to improve clarity.

Figure 9:
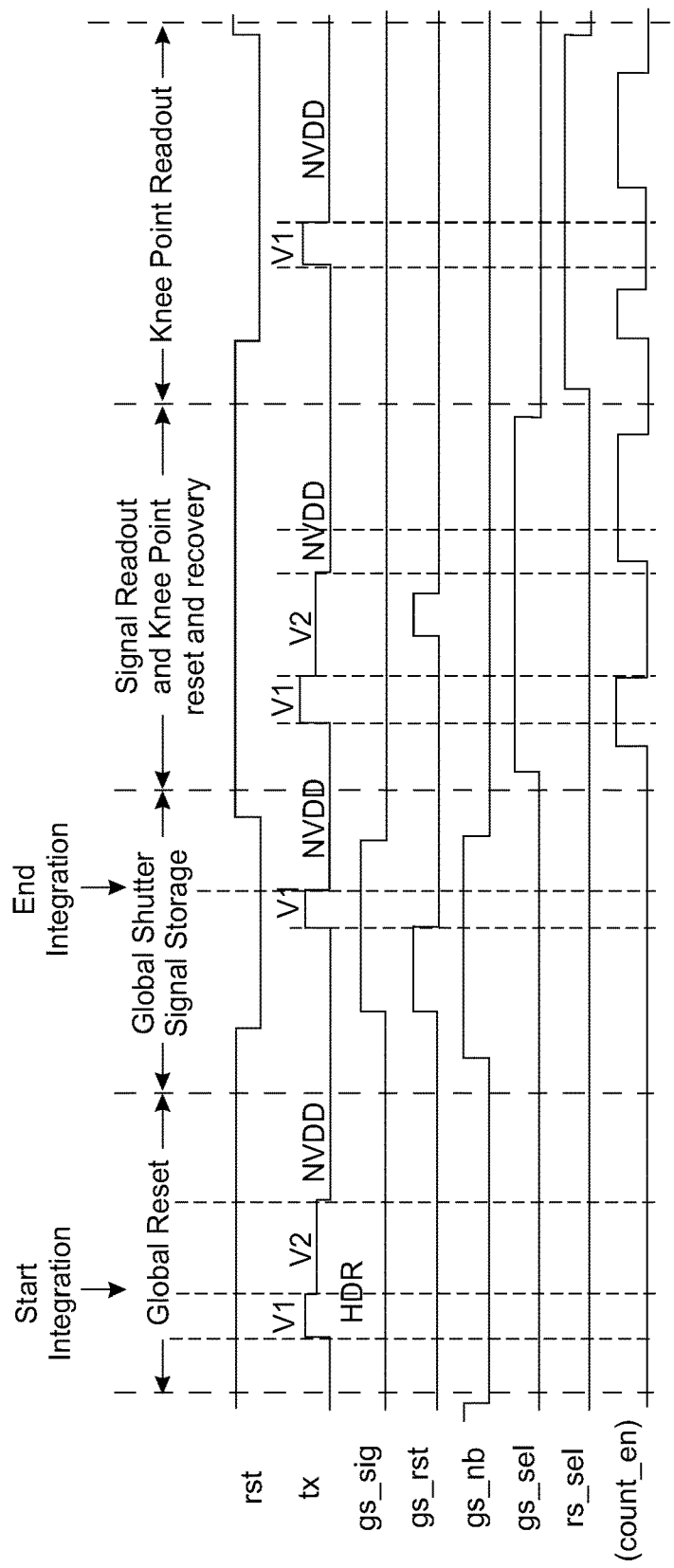
FIG. 9 is a timing diagram that illustrates a method for self knee point calibration in accordance with another embodiment of the invention.

FIG. 9 is a timing diagram that illustrates the invented method of operation of the invented apparatus for self-knee point calibration as applied to the pixel illustrated in FIG. 8. A detailed review of the timing diagram is not included here at this point in the application. The rise and fall and level of each signal is evident from the diagram. However, for the purpose of describing the invented apparatus and method related to the current invention an overview will follow. FIG. 9 in general illustrates a global shutter exposure and readout of a pixel array which incorporates a knee point manipulation of the transfer transistor gate voltage levels followed by a self calibration of the knee point levels. The key inventive element involves the use of the global shutter readout path, through its row select transistor GSW, to obtain a first imaging signal followed by the use of the rolling shutter readout path, through its row select transistor RSW, to obtain a second imaging signal which is useful in combination with the first imaging signal to perform the self calibration of the knee point voltage level and reduce fixed pattern noise due to the natural variation of the threshold voltages of the related transfer transistors. So FIG. 9 illustrates four time intervals during which control signals are applied to accomplish the self calibration of the knee point levels. During the first time interval the associated photodiode array is reset as a whole simultaneously, i.e., a global reset. The image charge collection also begins on all the photodiodes including the application of a knee point voltage level sequence applied to the transfer transistors. The voltage level sequence and the first interval ends with the transfer transistors being cut off. During the second interval the global shutter storage capacitors are reset, the image charge collection ends and it is transferred to the global shutter storage capacitors. As illustrated in FIG. 9, during the third interval, while the image charge on the capacitors is converted to an image signal and read out through the global shutter select transistor GSW, the knee point voltage sequence is again applied to the transfer transistors to collect a knee point calibration charge from the photodiodes. Lastly during the fourth time interval the knee point calibration charge is read out through the rolling shutter select transistor RSW.

Figure 10:
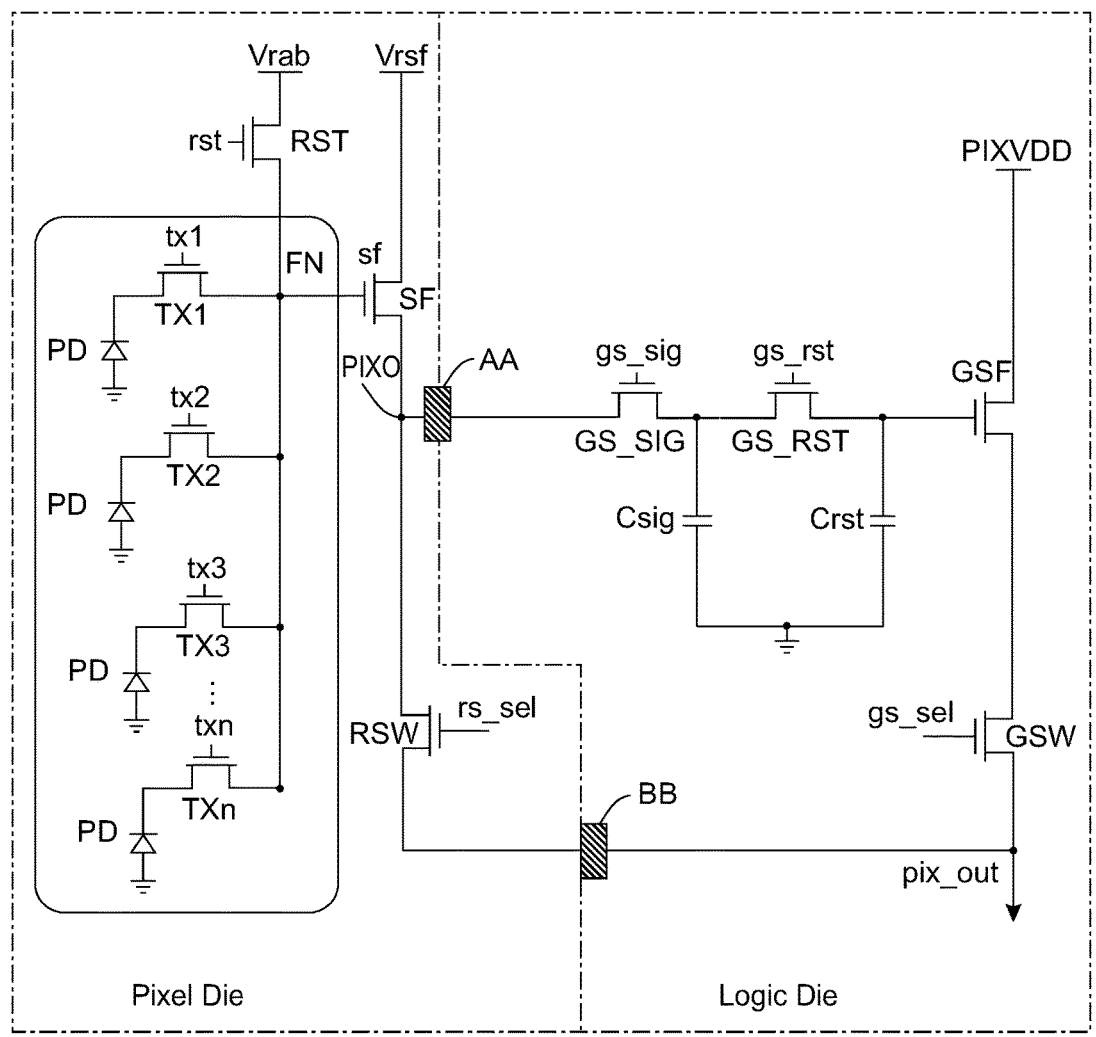
FIG. 10 is an electrical schematic diagram of a representative pixel portion of an image sensor array and an associated row decoder circuit portion of the image sensor in accordance with another embodiment of the invention.

FIG. 10 illustrates a circuit schematic diagram of another embodiment of the invented circuit to which self-knee point calibration is applied. Compared to the circuit illustrated in FIG. 8 the circuit illustrated in FIG. 10 deletes the bias transistor NB and provides a connection between the output electrodes of the global shutter select transistor GSW and the rolling shutter select transistor RSW. The signal readout and the sequential knee point calibration procedure is similar to that described in the previous paragraph.

Reference throughout this specification to "one embodiment," "an embodiment," "one example," or "an example" means that a particular feature, structure, or characteristic described in connection with the embodiment or example is included in at least one embodiment or example of the present invention. Thus, the appearances of the phrases such as "in one embodiment" or "in one example" in various places throughout this specification are not necessarily all referring to the same embodiment or example. Furthermore, the particular features, structures, or characteristics may be combined in any suitable manner in one or more embodiments or examples. Directional terminology such as "top", "down", "above", "below" are used with reference to the orientation of the figure(s) being described. Also, the terms "have," "include," "contain," and similar terms are defined to mean "comprising" unless specifically stated otherwise. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

The above description of illustrated examples of the present invention, including what is described in the Abstract, are not intended to be exhaustive or to be limited to the precise forms disclosed. While specific embodiments of, and examples for, the invention are described herein for illustrative purposes, various equivalent modifications are possible without departing from the broader spirit and scope of the present invention. Indeed, it is appreciated that the specific example structures and materials are provided for explanation purposes and that other structures and materials may also be employed in other embodiments and examples in accordance with the teachings of the present invention. These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation.

What is claimed is:

1. An imaging system, comprising:
   a first substrate having a front surface and a back surface;
   a first portion of an array of pixel cells disposed within the first substrate wherein each pixel cell first portion comprises:
      one or more transfer transistors coupled to respective photodiodes and sharing a floating drain;
      a reset transistor connected to the floating drain on one side and to a selectable reset power supply Vrab on its other side; and
      an amplifier transistor in a source follower configuration with its gate connected to the floating drain and its drain connected to an amplifier power supply Vrsf and its source connected to a rolling shutter row select transistor, wherein the first portion may accumulate an image charge in response to light incident upon the photodiodes and convert it to an image signal and couple it out of the first substrate to a column line of an image sensor when a rolling shutter readout mode is selected;
   a second portion of the array of pixels disposed within a second substrate stacked upon the front surface of the first substrate wherein each pixel cell second portion comprises a global shutter readout circuit block for coupling out the image signal from the amplifier transistor of the first portion through a global shutter amplifier transistor and a global shutter row select transistor to a column line of an image sensor when a global shutter readout mode is selected;
   a row decoder circuit repeatedly providing frame by frame a sequence of readout control signals in turn to each row of the pixel cells wherein the sequence comprises four time intervals, wherein the intervals comprise:
      first, a photodiode reset and expose interval;
      second, a photodiode image signal readout interval;
      third, a knee point reset and recovery interval; and
      fourth, a knee point readout interval for each row;
   a mode select switch within the row decoder circuit configured to supply the selectable reset power supply Vrab with a bimodal selection of either a high voltage level Vhi or an adjustable low voltage level Vlo;
   a programmable function logic circuit to provide to the row decoder circuit timing sequences and configurations;
   a configuration of the programmable function logic circuit wherein the mode select switch is engaged to change the reset power supply voltage Vrab to the adjustable low voltage Vlo during the knee point reset and recovery interval of each row while maintaining Vrab at the high level Vhi during the remaining three intervals, and wherein the row decoder provides a knee point reset and recovery signal level to the gate electrode of the transfer transistor during the knee point reset and recovery interval and wherein the knee point reset and recovery signal level determines a knee point of a two segment piecewise linear response curve representing the pixel image signal output versus increasing incident image light; and
   an inter-chip electrical interconnect which directly couples the source of the amplifier transistor on the first portion to the global shutter readout circuit block on the second portion.

2. The imaging system of claim 1 wherein the transfer transistors of the pixel cell and their respective photodiodes comprises four transistors and four photodiodes.

3. The imaging system of claim 1, wherein the programmable function logic circuit state is determined by the status of a selectable state register setting within the image sensor.

4. The imaging system of claim 1 wherein an output terminal of the rolling shutter select transistor is directly connected to an output terminal of the global shutter select transistor through an inter-chip electrical interconnect.

5. A method for reducing image sensor pixel array fixed pattern noise by calibrating a knee point voltage level of a two segment piecewise linear response curve representing the pixel image signal output versus increasing incident image light, wherein the pixels include a reset transistor with a bimodal selectable potential supply voltage and selectable rolling and global shutter readout circuits, the method comprising the steps of:
   providing a plurality of stacked imaging pixel cells comprising a first portion sensing and a rolling shutter readout circuit comprising a photodiode, a transfer transistor, a reset transistor, an amplifier transistor and a rolling shutter select transistor;
   providing a second portion global shutter readout circuit stacked on the first portion;
   providing a row decoder circuit which repeatedly provides frame by frame a sequence of readout control signals in turn to each row of the pixel cells wherein the sequence comprises four time intervals wherein the intervals comprise the sequence:
      first, a photodiode reset and expose interval;
      second, a photodiode image signal readout interval;
      third, a knee point reset and recovery interval; and
      fourth, a knee point readout interval for each row;
   providing a programmable function logic circuit to provide to the row decoder circuit timing sequences and configurations;
   providing from the row decoder a knee point signal level to the gate electrode of the transfer transistor first during the photodiode reset and expose interval and next during the knee point reset and recovery interval wherein the signal level determines a knee point of a two segment piecewise linear response curve representing the pixel image signal output versus increasing incident image light;
   reading out the image signal during the photodiode image signal readout interval through the rolling shutter readout circuit;
   providing a mode select switch within the row decoder circuit configured to supply the selectable reset power supply Vrab with a bimodal selection of either a high voltage level Vhi or an adjustable low voltage level Vlo;
   engaging the mode select switch to change the reset power supply voltage Vrab to the adjustable low voltage Vlo during the knee point reset and recovery interval of each row while maintaining Vrab at the high level Vhi during the remaining three intervals;
   reading out a knee point self calibration signal through the rolling shutter readout circuit during the knee point readout interval; and determining and applying an amended knee point voltage level to the gate electrode of the transfer transistor during the subsequent photodiode reset and expose interval.

6. A method for reducing image sensor pixel array fixed pattern noise by calibrating a knee point voltage level of a two segment piecewise linear response curve representing the pixel image signal output versus increasing incident image light, wherein the pixels include a reset transistor with a bimodal selectable potential supply voltage and selectable rolling and global shutter readout circuits, the method comprising the steps of:
providing a plurality of stacked imaging pixel cells comprising a first portion sensing and rolling shutter readout circuit comprising a photodiode, a transfer transistor with control signal txi, a reset transistor with control signal rst and drain supply voltage vrab, an amplifier transistor and a rolling shutter select transistor with control signal rs_sel;
providing a second portion global shutter readout circuit stacked on the first portion;
providing a row decoder circuit which repeatedly provides frame by frame a sequence of readout control signals in turn to each row of the pixel cells wherein the sequence comprises four time intervals wherein the intervals comprise the sequence:
first, a photodiode reset and expose interval;
second, a photodiode image signal readout interval;
third, a knee point reset and recovery interval; and
fourth, a knee point readout interval for each row;
providing a programmable function logic circuit to provide to the row decoder circuit timing sequences and configurations during the four time intervals as follows:
during the first interval rs_sel is low (off), vrab is at a high level Vhi, rst is high (on) and txi is set at three levels beginning with a high level to reset the photodiode then a knee point level to enhance dynamic range and then a cut off level to retain charge on the photodiode;
during the second interval vrab remains at Vhi, rs_sel is set high (on), rst is changed to low (off), and txi is pulsed high (on) to allow a rolling shutter readout of an image signal related to the charge collected on the photodiode during the first interval;
during the third interval rs_sel remains high, rst is changed to high, txi is set to high to reset the photodiode then vrab is set to an adjustable low level and txi is set to the knee point level used during the first interval to accumulate a charge related to the knee point level followed by setting txi to a cut off level and then returning vrab to Vhi;
during the fourth interval vrab remains at Vhi, rs_sel is set high (on), rst is changed to low (off), and txi is pulsed high (on) to allow a rolling shutter readout of an image signal related to the charge collected on the photodiode during the third interval and representative of the knee point level; and
determining from the self calibration knee point signal obtained during the third and fourth intervals an amended knee point voltage level and applying it to the gate electrode of the transfer transistor during the subsequent photodiode reset and expose (first) interval.

7. The method of claim 5, wherein operating the programmable function logic also comprises executing a digital algorithm designed to smooth the transition at the knee point of the two segment piecewise linear response curve representing the charging of a pixel photodiode due to increasing image light.

8. An imaging system, comprising:
a first substrate having a front surface and a back surface;
a first portion of an array of pixel cells disposed within the first substrate wherein each cell first portion comprises:
transfer transistors with control signals tx coupled to respective photodiodes and sharing a floating drain, wherein the transfer transistor control signals comprise two or more voltage levels determining a knee point of a two segment piecewise linear response curve representing the pixel image signal output versus increasing incident image light,
a reset transistor with control signal rst connected to the floating drain;
a first amplifier transistor in a source follower configuration with its gate connected to the floating drain and its source connected to a rolling shutter row select transistor with control signal rs_sel, wherein the first portion may accumulate an image charge in response to light incident upon the photodiodes and convert it to an image signal and couple it out of the first substrate through the row select transistor to a column line of an image sensor when the rolling shutter select transistor is activated;
a second portion of the array of pixels disposed within a second substrate and stacked upon the front surface of the first substrate wherein each cell second portion comprises:
a bias transistor NB connecting a ground to the first amplifier transistor source and controlled by a signal gs_nb; and
a global shutter signal control transistor with control signal gs_sig connected between the source of the first amplifier transistor and a global shutter signal storage capacitor Csig wherein the other side of Csig is connected to ground; and
a global shutter reset control transistor with control signal gs_rst connected between the global shutter signal control transistor and the gate electrode of a second amplifier transistor in a source follower configuration; and;
a global shutter reset capacitor Crst connected between the gate electrode of the second amplifier transistor and a ground terminal; and
a global shutter row select transistor with control signal gs_sel connecting the source of the second amplifier transistor to a column line for coupling out the image signal from the first amplifier transistor of the first portion through the second amplifier transistor when a global shutter row select transistor is activated;
a row decoder circuit repeatedly providing frame by frame a sequence of readout control signals in turn to each row of the pixel cells wherein the sequence comprises four time intervals wherein the intervals comprise:
first, a global reset interval; and
second, a global shutter signal storage interval; and
third, a signal readout and knee point reset and recovery interval; and
fourth, a knee point readout interval for each row;
a programmable function logic circuit to provide to the row decoder circuit timing sequences and configurations;
a configuration of the programmable function logic circuit wherein during the first interval a knee point dynamic range enhanced global shutter image charge is accumulated on the array and then during the second interval the image charge is transferred to the global storage capacitors and then during the third interval a first row of the image signal is readout through the global shutter select transistor and wherein also during the third interval a second knee point enhanced image signal is recovered from the first row and readout during the fourth interval through the rolling shutter select transistor and wherein the second knee point enhanced signal determines an amended knee point voltage level which is then applied to the gate electrode of the transfer transistors of the first row during the first interval of the subsequent imaging frame and wherein the application of the amended knee point voltage level reduces image sensor pixel array fixed pattern noise; and an inter-chip electrical interconnect which directly couples the source of the amplifier transistor on the first portion to the global shutter readout circuit block on the second portion.

9. A method for reducing image sensor pixel array fixed pattern noise by calibrating a knee point of a two segment piecewise linear response curve representing the pixel image signal output versus increasing incident image light, wherein the pixel includes both a rolling shutter and global shutter readout circuits, the method comprising the steps of:

providing a plurality of stacked imaging pixel cells comprising a first portion sensing and rolling shutter readout circuit comprising transfer transistors with control signals tx coupled to respective photodiodes and sharing a floating drain, wherein the transfer transistor control signals comprise two or more voltage levels for determining the knee point of the two segment piecewise linear response curve representing the pixel image signal output versus increasing incident image light;

providing a reset transistor connected to the floating drain;

providing a first amplifier transistor in a source follower configuration with its gate connected to the floating drain and its source connected to a rolling shutter row select transistor, wherein the first portion may accumulate an image charge in response to light incident upon the photodiodes and convert it to an image signal and couple it out of the first substrate through the row select transistor to a column line of an image sensor when the rolling shutter select transistor is activated;

providing a second portion global shutter storage and readout circuit of the array of pixel cells stacked upon the first portion wherein each cell second portion comprises:

a bias transistor NB connecting a ground to the first amplifier transistor source;

a global shutter signal control transistor connected between the source of the first amplifier transistor and a global shutter signal storage capacitor Csig wherein the other side of Csig is connected to ground;

a global shutter reset control transistor connected between the global shutter signal control transistor and the gate electrode of a second amplifier transistor in a source follower configuration;

a global shutter reset capacitor Crst connected between the gate electrode of the second amplifier transistor and a ground terminal; and a global shutter row select transistor connecting the source of the second amplifier transistor to a column line for coupling out the image signal from the first amplifier transistor of the first portion through the second amplifier transistor when a global shutter row select transistor is activated;

providing a row decoder circuit repeatedly providing frame by frame a sequence of readout control signals in turn to each row of the pixel cells wherein the sequence comprises four time intervals wherein the intervals comprise:

first, a global reset interval;

second, a global shutter signal storage interval;

third, a signal readout and knee point reset and recovery interval; and fourth, a knee point readout interval for each row;

providing a programmable function logic circuit to provide to the row decoder circuit timing sequences and configurations; and providing timing sequences through the function logic circuit wherein during the first interval a knee point dynamic range enhanced global shutter image charge is accumulated on the array and then during the second interval the image charge is transferred to the global storage capacitors and then during the third interval a first row of the image signal is readout through the global shutter select transistor and wherein also during the third interval a second knee point enhanced image signal is recovered from the first row and readout during the fourth interval through the rolling shutter select transistor and wherein the second knee point enhanced signal determines an amended knee point voltage level which is then applied to the gate electrode of the transfer transistors of the first row during the first interval of the subsequent imaging frame and wherein the application of the amended knee point voltage level reduces image sensor pixel array fixed pattern noise.

10. The method of claim 9, wherein operating the programmable function logic also comprises executing a digital algorithm designed to smooth the transition at the knee point of the two segment piecewise linear response curve representing the charging of a pixel photodiode due to increasing image light.

11. A method for reducing image sensor pixel array fixed pattern noise by calibrating a knee point of a two segment piecewise linear response curve representing the pixel image signal output versus increasing incident image light, wherein the pixel includes both a rolling shutter and global shutter readout circuits, the method comprising the steps of:

providing a plurality of stacked imaging pixel cells comprising a first portion sensing and rolling shutter readout circuit comprising transfer transistors with control signals tx coupled to respective photodiodes and sharing a floating drain, wherein the transfer transistor control signals comprise two or more voltage levels for determining the knee point of the two segment piecewise linear response curve representing the pixel image signal output versus increasing incident image light;

providing a reset transistor with control signal rst connected to the floating drain;

providing a first amplifier transistor in a source follower configuration with its gate connected to the floating drain and its source connected to a rolling shutter row select transistor with control signal rs_sel, wherein the first portion may accumulate an image charge in response to light incident upon the photodiodes and convert it to an image signal and couple it out of the first substrate through the row select transistor to a column line of an image sensor when the rolling shutter select transistor is activated;

providing a second portion global shutter storage and readout circuit of the array of pixel cells stacked upon the first portion wherein each cell second portion comprises:
- a bias transistor NB connecting a ground to the first amplifier transistor source and controlled by a signal gs_nb;
- a global shutter signal control transistor with control signal gs_sig connected between the source of the first amplifier transistor and a global shutter signal storage capacitor Csig wherein the other side of Csig is connected to ground;
- a global shutter reset control transistor with control signal gs_rst connected between the global shutter signal control transistor and the gate electrode of a second amplifier transistor in a source follower configuration;
- a global shutter reset capacitor Crst connected between the gate electrode of the second amplifier transistor and a ground terminal; and
- a global shutter row select transistor with control signal gs_sel connecting the source of the second amplifier transistor to a column line for coupling out the image signal from the first amplifier transistor of the first portion through the second amplifier transistor when a global shutter row select transistor is activated;

providing a row decoder circuit repeatedly providing frame by frame a sequence of readout control signals in turn to each row of the pixel cells wherein the sequence comprises four time intervals wherein the intervals comprise:
- first, a global reset interval;
- second, a global shutter signal storage interval;
- third, a signal readout and knee point reset and recovery interval; and
- fourth, a knee point readout interval for each row;

providing a programmable function logic circuit to provide to the row decoder circuit timing sequences and configurations during the four intervals as follows:

during the first interval rs_sel, gs_sel, gs_nb, gs_rst and gs_sig are all set low (off), rst is set high (on) and txi is set successively at three levels beginning with a high level to reset the photodiode then a knee point level to enhance dynamic range and then a cut off level to retain charge on the photodiode as the first interval ends;

during the second interval rs_sel and gs_sel remain low, and the interval begins with gs_nb set high followed by rst being set low followed by gs_sig being set high followed by gs_rst being set high and then low followed by txi being pulsed high then low to allow transfer and storage of a global shutter image signal related to the charge collected on the photodiode during the first interval;

during the remaining part of the second interval gs_nb and gs_sig are set low and rst is set high to end the second interval;

during the third interval rs_sel, gs_nb, gs_sig, gs_rst and tx remain low, rst remains high and then two sequences of steps occur simultaneously, one in the second portion and one in the first portion, as follows: in the second portion gs_sel is changed to high and gs_rst is pulsed high then low to read out the global shutter image signal stored on the capacitors after which gs_sel is set low; in the first portion txi is set successively at three levels beginning with a high level to reset the photodiode then a knee point level to enhance dynamic range and then a cut off level to retain charge on the photodiode as the third interval ends; and during the fourth interval interval gs_sel, gs_nb, gs_rst, gs_sig and tx remain off and the interval begins with rs_sel being set high followed by rst being set low and txi being pulsed high and then low to allow a rolling shutter readout of the image signal related to the charge collected on the photodiode during the third interval and representative of the knee point level; and determining from the self calibration knee point signal obtained during the third and fourth intervals an amended knee point voltage level which is then applied to the gate electrode of the transfer transistors of the first row during the first interval of the subsequent imaging frame and wherein the application of the amended knee point voltage level reduces image sensor pixel array fixed pattern noise.

* * * * *